(12) United States Patent
Cournoyer et al.

(10) Patent No.: US 11,476,517 B2
(45) Date of Patent: Oct. 18, 2022

(54) TEMPERATURE GRADIENT CONTROL WITH THERMAL INTERFACE MATERIAL VARIATION

(71) Applicant: Rivian IP Holdings, LLC, Plymouth, MI (US)

(72) Inventors: Travis Cournoyer, Redondo Beach, CA (US); Kyle Butterfield, Rancho Santa Margarita, CA (US); Nathaniel Wynn, Tustin, CA (US); Tyler Collins, Irvine, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 204 days.

(21) Appl. No.: 17/026,919

(22) Filed: Sep. 21, 2020

(65) Prior Publication Data
US 2022/0093991 A1 Mar. 24, 2022

(51) Int. Cl.
*H01M 10/6556* (2014.01)
*H01M 10/643* (2014.01)
*H01M 10/613* (2014.01)

(52) U.S. Cl.
CPC ..... *H01M 10/6556* (2015.04); *H01M 10/613* (2015.04); *H01M 10/643* (2015.04)

(58) Field of Classification Search
CPC .......... H01M 10/6556; H01M 10/613; H01M 10/643; H01M 10/653; H01M 50/213; H01M 10/6554
See application file for complete search history.

(56) References Cited

U.S. PATENT DOCUMENTS

| 2018/0358669 A1* | 12/2018 | Brisbane | ............. H01M 10/617 |
| 2020/0212518 A1* | 7/2020 | Jin | .................... H01M 10/6556 |
| 2021/0203020 A1* | 7/2021 | Ahn | ...................... H01M 50/20 |

* cited by examiner

*Primary Examiner* — Stewart A Fraser
(74) *Attorney, Agent, or Firm* — Haley Guiliano LLP

(57) ABSTRACT

A battery module and a method of assembling the battery module are provided. The battery module includes a cooling surface having a first area and a second area with different cooling capacities, an adhesive including a first component having a first thermal conductivity and a second component having a second thermal conductivity, and a first battery and a second battery. The first battery is secured to the first area by a first portion of the adhesive and the second battery is secured to the second area by a second portion the adhesive. The first portion of the adhesive has a first ratio of the first component to the second component and the second portion of the adhesive has a second ratio of the first component to the second component. The first and second ratios are different and compensate for the different cooling capacities of the first and second areas.

20 Claims, 5 Drawing Sheets

TEMPERATURE GRADIENT CONTROL WITH THERMAL INTERFACE MATERIAL VARIATION

SUMMARY

It is advantageous to package battery cells closely in high-voltage, large-format battery modules to provide high energy density battery modules. To provide a high energy density battery module, cylindrical battery cells may be arranged with a bottom end of each of the battery cells secured to a cooling surface of the battery module using an adhesive. However, in such battery modules, the thermal gradient across the plurality of battery cells in the battery module needs to be effectively controlled so that all of the battery cells are equally cooled.

Thus, it is advantageous for the cooling capacity of the cooling surface to be uniform across the cooling surface. If the cooling capacity of the cooling surface varies across the cooling surface and the thermal gradient across the plurality of battery cells is not effectively controlled, certain battery cells will be cooled less than other battery cells in the battery module and will degrade faster than the other battery cells, resulting in accelerated capacity loss of the overall battery module. Additionally, if the thermal gradient across the plurality of battery cells is not effectively controlled, it may be difficult to estimate the temperature of each of the battery cells in the battery module during operation (e.g., by measuring the temperature of select battery cells and estimating the temperature of the other battery cells based on the measured temperatures) without directly measuring the temperature of each of the battery cells.

These problems may be particularly relevant to large format battery modules having several arrays of battery cells electrically connected in parallel groups because temperature sensors for many or all of the battery cells may add cost and complexity, and because the capacity loss of a single battery cell in a parallel group of battery cells may be propagated to all the battery cells in the parallel group of battery cells, thereby significantly lowering the capacity of the battery module.

To solve these problems, systems and methods are provided herein for efficiently controlling the thermal gradient across a plurality of battery cells in a battery module (e.g., a high energy density battery module). To accomplish this, a battery module and a method of assembling the battery module are provided. The battery module includes a cooling surface including a first area and a second area each having a different cooling capacity, an adhesive including a first component having a first thermal conductivity and a second component having a second thermal conductivity, and a first battery and a second battery. A first end of the first battery is secured to the first area by a first portion of the adhesive and a first end of the second battery is secured to the second area by a second portion the adhesive. The first portion of the adhesive has a first ratio of the first component to the second component and the second portion of the adhesive has a second ratio of the first component to the second component. The first ratio and the second ratio are different and compensate for the different cooling capacities of the first area and the second area.

In some embodiments of the present disclosure, each of the first component and the second component may be a resin, and the adhesive may further include a hardener.

In some embodiments of the present disclosure, the battery module may further include a cooling plate. The cooling surface may form a first side of the cooling plate.

In some embodiments of the present disclosure, the cooling plate may further include an input port, an output port, and a cooling channel. Cooling fluid may pass from the input port to the output port through the cooling channel.

In some embodiments of the present disclosure, the first area may have a first cooling capacity and the second area has a second cooling capacity, the first cooling capacity may be greater than the second cooling capacity, the first thermal conductivity may be greater than the second thermal conductivity, the first ratio of the first component to the second component may be greater than the second ratio of the first component to the second component, and the first ratio and the second ratio may compensate for the difference between the first cooling capacity and the second cooling capacity such that the first battery and the second battery may be provided with the same cooling capacity.

In some embodiments of the present disclosure, the first thermal conductivity may be greater than or equal to 1.0 Watts/meter*Kelvin (W/m*K), and the second thermal conductivity may be less than or equal to 0.3 W/m*K.

In some embodiments of the present disclosure, the adhesive may further include a plurality of beads for spacing the first end of each of the first battery and the second battery a predetermined distance from the cooling surface.

In some embodiments of the present disclosure, the cooling surface may be a first cooling surface, and the battery module may further include a second cooling surface, opposite to the first cooling surface. The second cooling surface may include a third area and a fourth area, and the third area and the fourth area may have different cooling capacities. The battery module may further include a third battery and a fourth battery. A first end of the third battery may be secured to the third area by a third portion of the adhesive, a first end of the fourth battery may be secured to the fourth area by a fourth portion the adhesive, the third portion may have a third ratio of the first component to the second component and the second portion may have a fourth ratio of the first component to the second component, and the third ratio and the fourth ratio may be different and may compensate for the different cooling capacities of the third area and the fourth area such that the third battery and the fourth battery may be provided with similar cooling capacity.

In some embodiments of the present disclosure, the first ratio may be an average ratio of the first component to the second component of the first portion, and a ratio of the first component to the second component of the first portion may vary within the first area.

In some embodiments of the present disclosure, the first ratio may be consistent within the first portion.

In some embodiments, a method of assembling a battery module is provided. The method includes providing a cooling surface with a cooling capacity that varies across the cooling surface, providing an adhesive including a first component having a first thermal conductivity to a second component having a second thermal conductivity, providing a first battery and a second battery, applying the adhesive with a first ratio of the first component to the second component to a first area of the cooling surface, applying the adhesive with a second ratio of the first component to the second component to a second area of the cooling surface, securing a first end of the first battery to the first area using the adhesive applied to the first area, and securing a first end of the second battery to the second area using the adhesive applied to the second area. The first ratio and the second ratio are different and compensate for the different cooling capacities of the first area and the second area.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

In view of the foregoing, and in accordance with some embodiments of the present disclosure, it would be advantageous to provide and easily manufacture a battery module with a high energy density that efficiently controls the thermal gradient across the plurality of battery cells in the battery module. In some embodiments, the battery module provided herein may use any cooling surface for providing uniform cooling, including a cooling surface of a cooling plate using liquid cooling. To do this, the battery module described herein may use an adhesive (e.g., a thermal interface material) with a variable thermal coefficient to secure each of the battery cells in the battery module to a cooling surface. By varying the thermal coefficient of the adhesive based on a cooling profile of the cooling surface, the adhesive may compensate for any differences in cooling capacity across the cooling surface, thereby ensuring uniform cooling (or heating) of all of the battery cells in the battery module.

Figure 1:
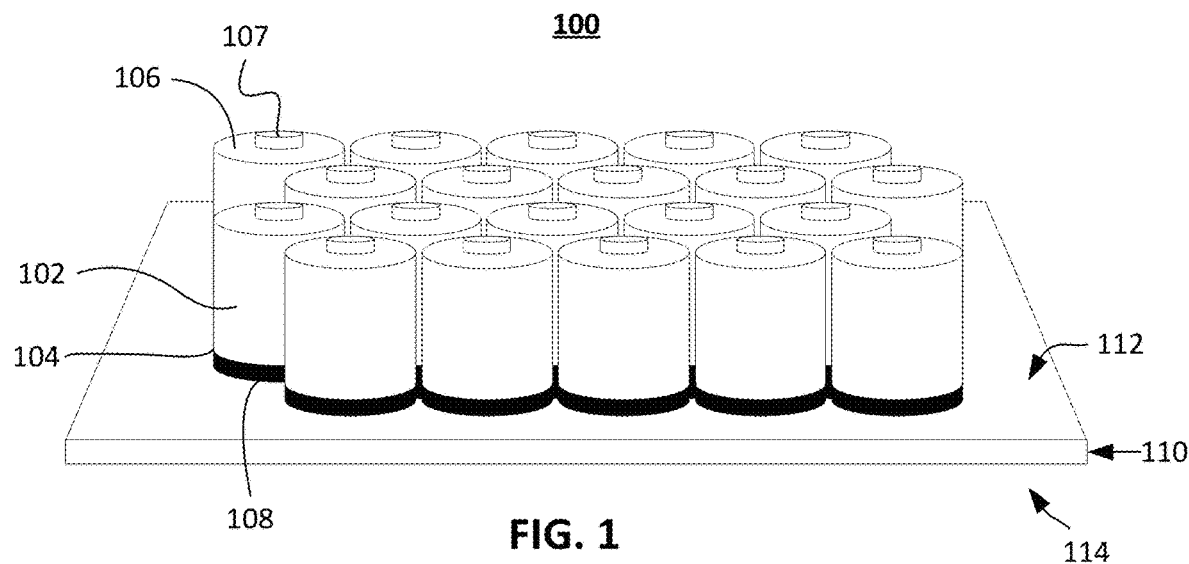
FIG. 1 shows a view of a battery module, in accordance with some embodiments of the present disclosure.

FIG. 1 shows a view of a battery module 100, in accordance with some embodiments of the present disclosure. As shown, the battery module 100 includes a plurality of battery cells 102. Each of the battery cells 102 may be cylindrical and may have a first end 104 comprising a first electrical terminal and a second end 106 having a second electrical terminal 107 (e.g., a center button terminal). In some embodiments of the present disclosure, each of the battery cells 102 may have an exposed region of electrically-active casing or a conductive jacket that covers at least a portion of the first end 104 and a side of each battery cell 102, forming the first electrical terminal. To increase packing density, the battery cells 102 may be arranged in rows that are offset from each other (e.g., in a hexagonal close-packed arrangement). In some embodiments of the present disclosure, each adjacent pair of the battery cells 102 may be 1.5 mm apart or less. Groups of the battery cells 102 may be electrically connected in series or parallel using one or more busbars (not shown for simplicity). In some embodiments of the present disclosure, several battery cells 102 may be connected in parallel to form a subgroup, and a plurality of subgroups may be connected in series. In some embodiments of the present disclosure, the plurality of subgroups may be voltage balanced against each other. It should be understood that there may be any suitable number of the battery cells 102.

The battery module 100 may further include a thermal transfer plate, e.g., a cooling plate 110, as shown. The cooling plate 110 may have a first cooling surface 112. As shown, the first end 104 of each of battery cells 102 may be secured to the first cooling surface 112 by an adhesive 108. As described in greater detail below, the adhesive 108 may be an adhesive with a variable heat transfer coefficient. In some embodiments of the present disclosure, the cooling plate 110 may be used to selectively cool (or heat) the battery cells 102. In some embodiments of the present disclosure, the cooling plate 110 may have one or more channels for cooling/heating fluid to travel through, as described in greater detail below with reference to FIG. 3A. In some embodiments of the present disclosure, the cooling plate 110 may be composed of an electrically conductive material (e.g., a metal such as aluminum). In some embodiments of the present disclosure, in order to reduce the likelihood of an electrical short between the battery cells 102 and the first cooling surface 112, the first cooling surface 112 may comprise a dielectric coating. The cooling plate 110 may have a second cooling surface 114, opposite to the first cooling surface 112, which may also comprise a dielectric coating.

Figure 2:
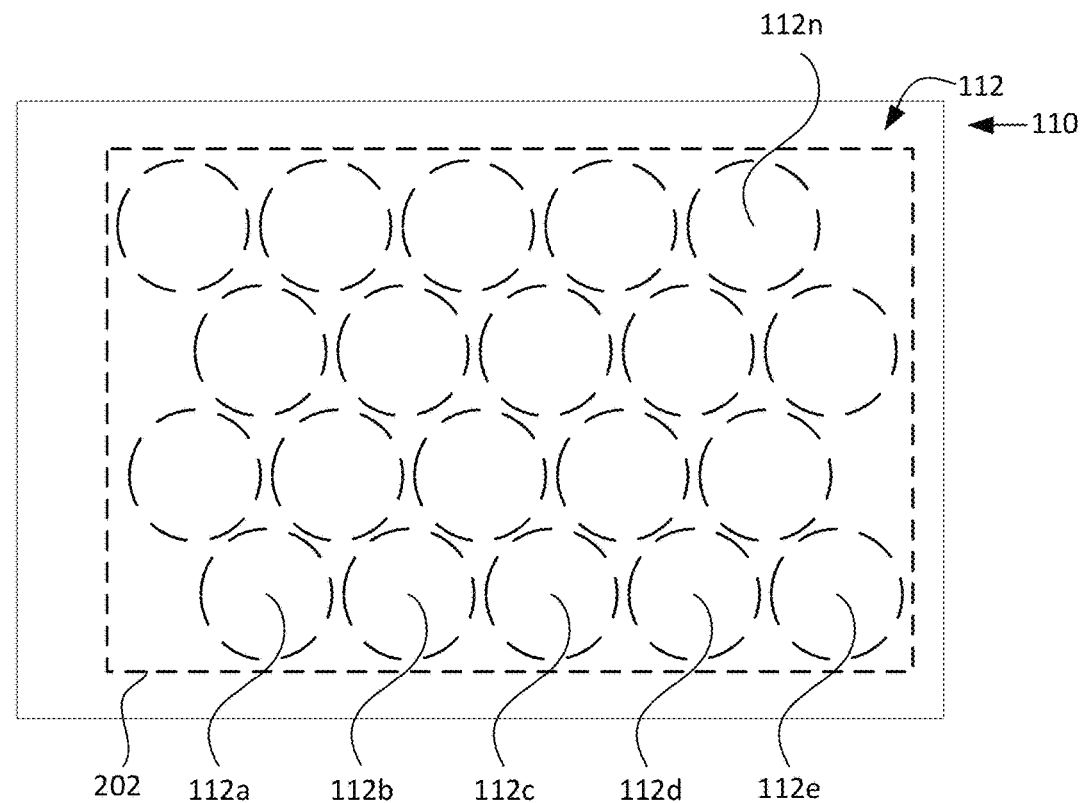
FIG. 2 shows a top view of a planned arrangement of battery cells on a first cooling surface of a cooling plate, in accordance with some embodiments of the present disclosure.

FIG. 2 shows a top view of a planned arrangement of the battery cells 102 on the first cooling surface 112 of the cooling plate 110, in accordance with some embodiments of the present disclosure. For convenience of description, a planned arrangement of four rows of five battery cells 102 per row is shown. However, it should be understood that there may be any suitable number of the battery cells 102 in any arrangement. As shown, the planned arrangement of the battery cells 102 may be within a battery mounting region 202 of the first cooling surface 112.

Before the battery cells 102 are secured to the first cooling surface 112, a cooling profile of the first cooling surface 112 may be determined. The cooling profile of the first cooling surface 112 refers to a cooling capacity provided at each point or localized area across the first cooling surface 112. In some embodiments of the present disclosure, the cooling profile of the first cooling surface 112 includes the entire area within the battery mounting region 202. In some embodiments of the present disclosure, the cooling profile of the first cooling surface 112 includes only the portions of the first cooling surface 112 corresponding to the planned placement of each of the battery cells 102 (i.e., 112a, 112b, 112c, 112d, 112e, ... 112n).

The cooling capacity at each point across the first cooling surface 112 may vary based on a number of factors including, for example, the proximity to an edge of the cooling plate 110, the proximity to a cooling channel (e.g., alignment/misalignment with the cooling channel), and the temperature of cooling fluid in the cooling channel, the proximity to other devices mounted on the first cooling surface 112, and any other factors that affect the cooling capacity. For example, the thickness of the overall stack between the bottom of battery cell 102 mounted on the first cooling surface 112 and the cooling fluid in the cooling channel may also affect the cooling capacity. In some embodiments of the present disclosure, the cooling profile of the first cooling surface 112 may be determined by experimentation. For example, the cooling capacity at each point across the first cooling surface 112 may be measured. In some embodiments of the present disclosure, the cooling profile of the first cooling surface 112 may be estimated by modeling the first cooling surface 112. In some embodiments of the present disclosure, the cooling profile of the first cooling surface 112 may be determined in advance and stored in a memory.

The resolution of the cooling profile of the first cooling surface 112 may vary based on the particular application. In some embodiments of the present disclosure, as explained in greater detail below, the resolution of the cooling profile of the first cooling surface 112 may correspond to the resolution at which the thermal coefficient of the adhesive can be changed (e.g., 1 mm). In some embodiments of the present disclosure, to determine the cooling profile, the cooling capacity of each portion (e.g., 1 mm×1 mm) of the first cooling surface 112 may be determined. In some embodiments of the present disclosure, the first cooling profile of the first cooling surface 112 may include the average cooling capacity of each of the portions of the first cooling surface 112 corresponding to the planned placements of the battery cells 102 (i.e., 112a, 112b, 112c, 112d, 112e, . . . 112n). It should be understood that the resolution of the cooling profile of the first cooling surface 112 may be any resolution.

Figure 3A:
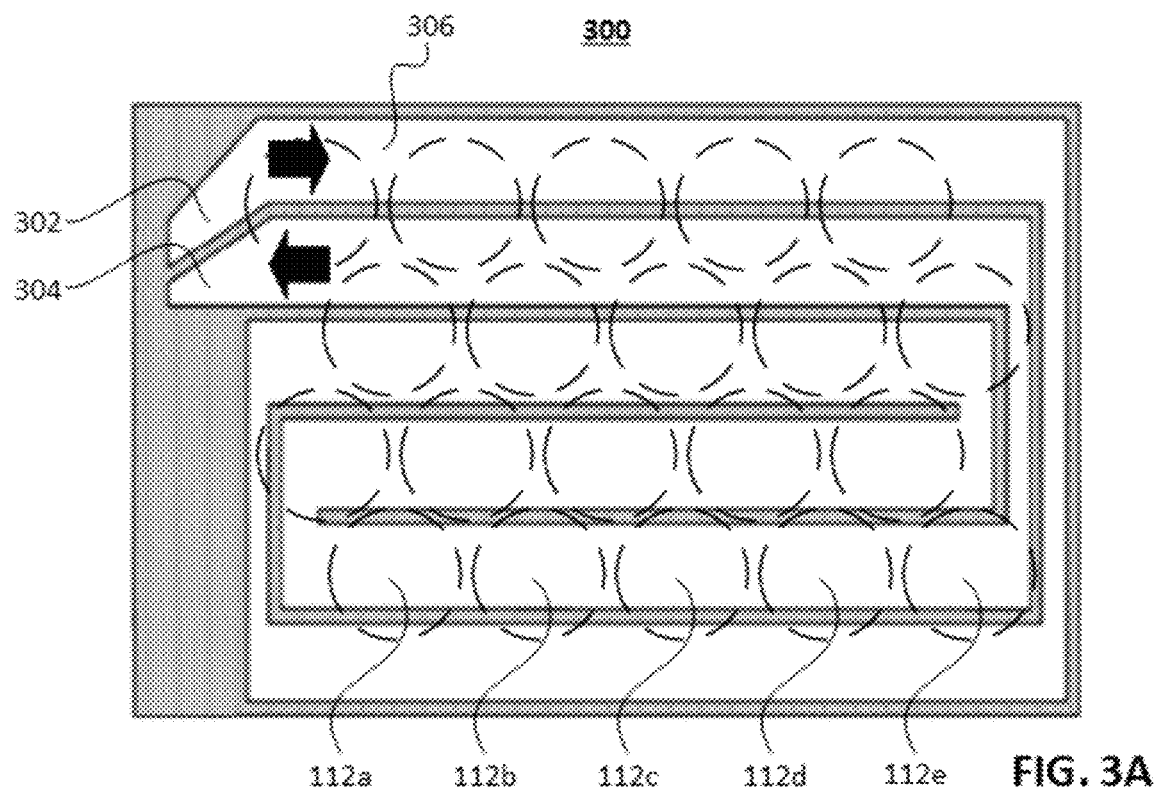
FIG. 3A shows a cross-sectional view through the center of an illustrative cooling plate, in accordance with some embodiments of the present disclosure.

FIG. 3A shows a cross-sectional view through the center of an illustrative cooling plate 300, in accordance with some embodiments of the present disclosure. A first region 302 may correspond to an input port of the cooling plate 300, while a second region 304 may correspond to an output port of the cooling plate 300. The first region 302 and the second region 304 may be connected by a channel 306. Cooling fluid may enter the cooling plate 300 at the input port, by region 302, and travel along the channel 306, before reaching the second region 304 and exiting the cooling plate 300 through the output port (i.e., in the direction indicated by the arrows). As the cooling fluid travels through the cooling plate 300, the cooling fluid absorbs heat and becomes warmer. Accordingly, even if the arrangement of the channel 306 is optimized for a planned arrangement of the battery cells 102, the cooling profile of the cooling plate 300 may still vary across the cooling surface of the cooling plate 300. For example, as shown, the cooling fluid flows through the channel 306 in a direction from the first planned battery cell placement 112a to the fifth planned battery cell placement 112e. Thus, the battery cell 102 at the first planned battery cell placement 112a may be provided with more cooling capacity than, e.g., the battery cell 102 at the fifth planned battery cell placement 112e. However, as set forth above, the cooling profile of the first cooling surface 112 may vary based on other factors (e.g., distance to an edge, proximity to other batteries, electrical elements, etc.).

Returning to FIG. 1, the first end 104 of the battery cells 102 may be secured to the first cooling surface 112 by the adhesive 108. The electrical, thermal, and mechanical properties of the adhesive 108 of the present disclosure may correspond to the engineering and manufacturing requirements associated with the battery module 100. In some embodiments of the present disclosure, the adhesive 108 may be a thermal interface material having a thermal conductivity that can be varied. In some embodiments of the present disclosure, the adhesive 108 may include at least two different components having different thermal conductivities. For example, the adhesive 108 may include at least two different resins (e.g., an epoxy resin, a polyester resin, an acrylic resin, etc.) and a curative (e.g., a hardener or an initiator). By varying the ratio of the two resin components in the adhesive 108, the thermal conductivity of the adhesive 108 may be varied. Of course, this is only one example, and the adhesive may have more than two different resin components having different thermal conductivities. In some embodiments, the adhesive 108 may include a resin and at least two different curatives having different thermal conductivities.

In some embodiments of the present disclosure, the first component of the adhesive (a first resin) may have a higher thermal conductivity than the second component of the adhesive (a second resin). For example, the first resin may have a thermal conductivity of 1.4 Watts/meter*Kelvin (W/m*K). However, this is only one example, and the first resin may have a thermal conductivity greater than or equal to 1.0 W/m*K. The second resin may have a thermal conductivity of 0.1 Wm*K. However, this is only one example, and the second resin may have a thermal conductive less than or equal to 0.3 W/m*K.

In some embodiments of the present disclosure, the ratio of the first resin to the second resin in the adhesive 108 may be varied based on the cooling profile of the first cooling surface 112. By varying the ratio of the first to the second resin in the adhesive 108 based on the cooling profile of the first cooling surface 112, the adhesive 108 may compensate for variabilities in the cooling capacity across the first cooling surface 112 and provide equal cooling to each of the battery cells 102 mounted thereon. For example, the first resin has a thermal conductivity of 1.0 Wm*K and the second resin has a thermal conductivity of 0.3 W/m*K, the thermal conductivity of the adhesive 108 may be varied from 0.3 W/m*K-1.0 Wm*K by varying the ratio of the first resin to the second resin from 0/100 to 100/0.

In some embodiments of the present disclosure, the thermal conductivities of the first and second resins may be varied by doping with standard additives that are thermally conductive but electrically insulative such as alumina, boron nitride, alumina trihydrate, or magnesium hydroxide, where the latter two materials may impart added flame retardancy properties to the mixed adhesive at the cost of reduced thermal conductivity to weight ratio. In some embodiments of the present disclosure, the second resin may have its viscoelastic properties modified to match that of the first resin by addition of additives with low thermal conductivities such as fumed silica or other thickeners to increase viscosity while still keeping the thermal conductivity low. In some embodiments of the present disclosure, it may be advantageous for the thermal conductivities of both of the first and second resins to be high in order to maximize the cooling provided by the first cooling surface 112. For example, if the cooling profile of the first cooling surface 112 does not include a large amount of variation across the first cooling surface 112, the difference between the thermal conductivities of the first and second resins may be smaller than the entire range of possible thermal conductivities.

In some embodiments of the present disclosure, in order to maximize the cooling provided by the first cooling surface 112, the adhesive 108 having the highest possible thermal conductivity should be applied to the area of the first cooling surface 112 having the lowest cooling capacity conductivity (e.g., a ratio of 100/0 of the first resin to the second resin). In some embodiments of the present disclosure, based on, e.g., limitations of the ratios of the resins or the way in which they are applied, the ratio of the first resin to the second resin may be limited to a minimum amount of the first resin or the second resin (e.g., 10/90).

In some embodiments of the present disclosure, it may be advantageous to maintain the uniformity of the thickness of the cured adhesive 108 so that the battery cells 102 are spaced apart from the first cooling surface 112 by a same distance. In some embodiments of the present disclosure, the thickness of the adhesive 108 may be controlled by impregnating the adhesive with glass beads (or other materials) having a predetermined size. In some embodiments of the present disclosure, the thickness of the adhesive 108 may be controlled by using pre-cured adhesive standoffs to maintain the uniform distance between each of the battery cells 102 and the first cooling surface 112 while the adhesive 108 cures. Aside from securing the battery cells 102 to the first cooling surface 112 and compensating for the variabilities in cooling capacity across the first cooling surface 112, the adhesive 108 should also maintain electrical isolation between the battery cells 102 and the first cooling surface 112 and maintain electrical isolation between each parallel connected group of the battery cells 102. Thus, the adhesive 108 should also have sufficient dielectric properties.

Figure 3B:
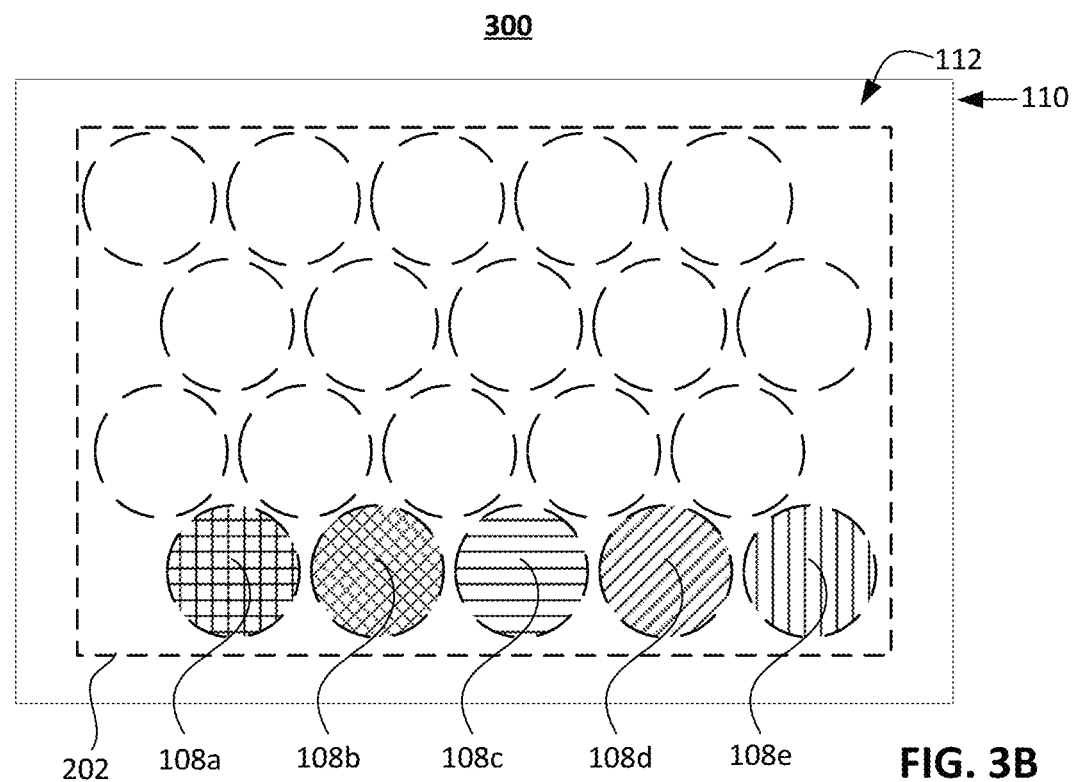
FIG. 3B shows an adhesive having varied thermal conductivity applied to the first cooling surface of the illustrative cooling plate, in accordance with some embodiments of the present disclosure.

FIG. 3B shows the adhesive 108 having varied thermal conductivity applied to the first cooling surface 112 of the illustrative cooling plate 300, in accordance with some embodiments of the present disclosure. To avoid overcomplicating the description, FIG. 3B shows the adhesive 108 only being applied to the first planned battery cell placement 112a through the fifth planned battery cell placement 112e. However, it should be understood that the adhesive 108 is applied to all of the planned battery cell placements or the entire area within the battery mounting region 202. As shown via different fill patterns, the ratio of the first resin to the second resin of the adhesive 108 may be varied for each of the first planned battery cell placement 112a through the fifth planned battery cell placement 112e, based on the cooling profile of the first cooling surface 112. In some embodiments of the present disclosure, the cooling profile of the first cooling surface 112 may include an average cooling capacity of each of the first planned battery cell placement 112a through the fifth planned battery cell placement 112e. In this case, a different ratio of the first resin to the second resin of the adhesive 108 may be determined for each of the planned battery cell placements. For example, if the cooling profile of the first cooling surface 112 indicates that the cooling capacity of the first cooling surface 112 slowly decreases from the first planned battery cell placement 112a through the fifth planned battery cell placement 112e, the ratio of the first resin (having a high thermal conductivity) to the second resin (having a low thermal conductivity) may slowly increase so that each of the battery cells 102 provided at the first planned battery cell placement 112a through the fifth planned battery cell placement 112e is equally cooled. Although, as shown, the first planned battery cell placement 112a has a first ratio 108a of the first resin to the second resin of the adhesive 108, the second planned battery cell placement 112b has a second ratio 108b of the first resin to the second resin of the adhesive 108, the third planned battery cell placement 112c has a third ratio 108c of the first resin to the second resin of the adhesive 108, the fourth planned battery cell placement 112d has a fourth ratio 108d of the first resin to the second resin of the adhesive 108, and the fifth planned battery cell placement 112e has a fifth ratio 108e of the first resin to the second resin of the adhesive 108, this is only an example, and the ratio of the first resin to the second resin of the adhesive 108 may gradually change across each of the planned battery cell placements or the entire area within the battery mounting region 202. After the adhesive 108 is applied to the first cooling surface 112, the battery cells 102 may be disposed on the adhesive 108.

Figure 4:
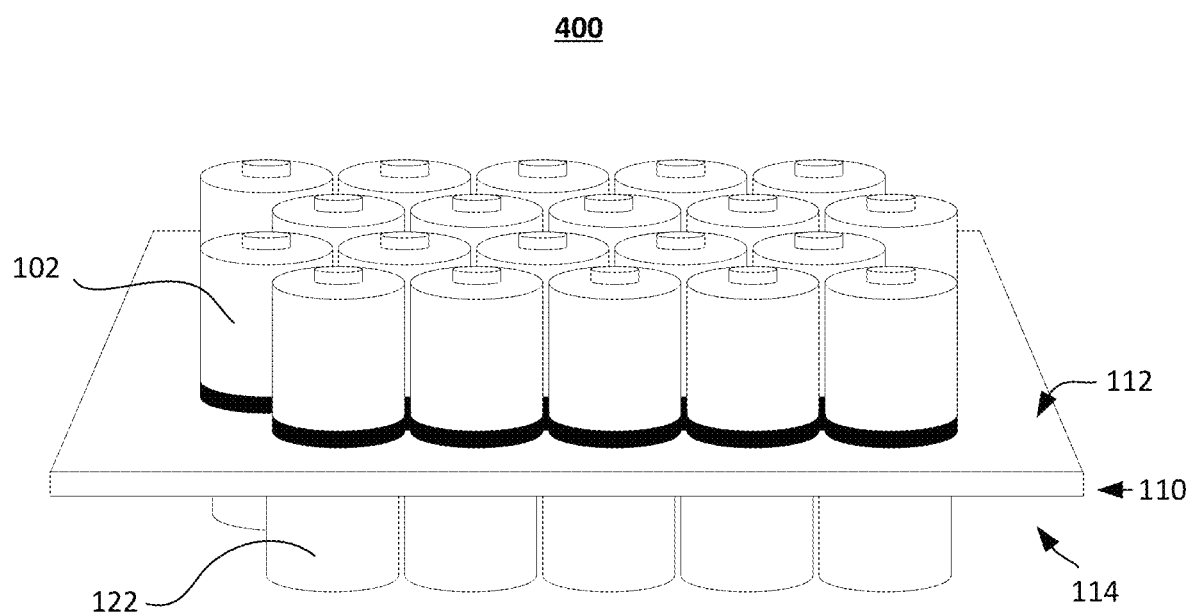
FIG. 4 shows a view of a battery module, in accordance with some embodiments of the present disclosure.

FIG. 4 shows a view of a battery module 400, in accordance with some embodiments of the present disclosure. As shown, the battery module 400 corresponds to the battery module 100, except that a plurality of battery cells 122 are provided on the second cooling surface 114. The battery cells 122 may be provided in the same manner as described above with reference to the battery cells 102 and the first cooling surface 112.

Figure 5:
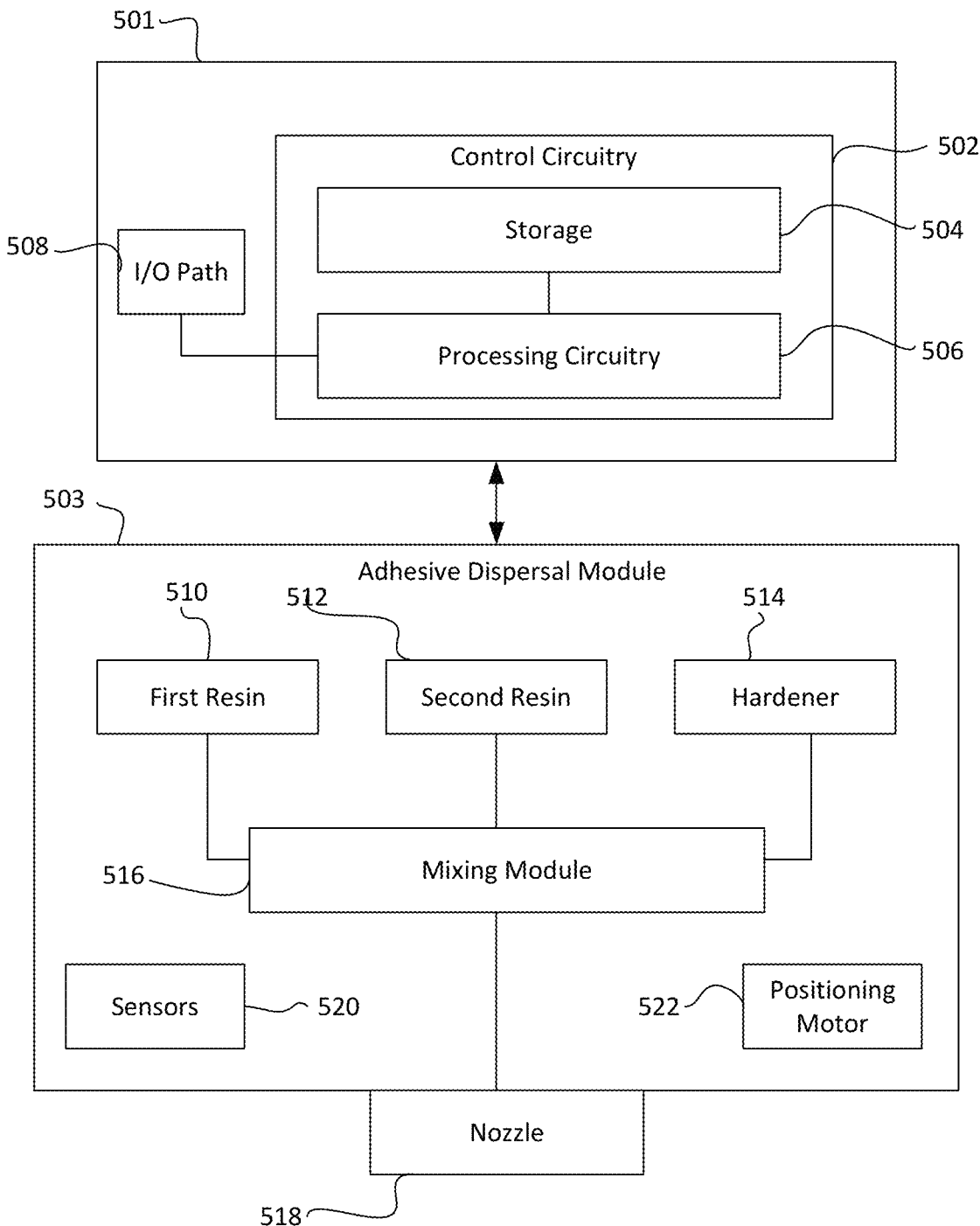
FIG. 5 shows a block diagram of an apparatus for mixing and disposing an adhesive on the first cooling surface of the cooling plate, in accordance with some embodiments of the present disclosure.

FIG. 5 shows a block diagram of an apparatus 500 for mixing and dispensing the adhesive 108 on the first cooling surface 112 of the cooling plate 110, in accordance with some embodiments of the present disclosure. However, this is only one example and the apparatus 500 may alternatively (or additionally) dispense the adhesive 108 on the first end 104 of each of the battery cells 102. Although the apparatus 500 may dispense the adhesive 108 on the second cooling surface 114 of the cooling plate 110 (and/or the end of each of the battery cells 122), only the first cooling surface 112 is discussed herein to avoid overcomplicating the description. As shown, the apparatus 500 may include a controller 501 and an adhesive dispersal module 503 connected to the controller. Although the controller 501 and the adhesive dispersal module 503 are shown as separate devices (e.g., wired or wirelessly connected), the controller 501 and the adhesive dispersal module 503 may be included in the same device.

The controller 501 may include control circuitry 502 that includes a storage 504 and processing circuitry 506, and an input/output (I/O) path 508. The controller 501 may receive content and data via the I/O path 508. For example, cooling profiles and planned arrangements of battery cells may be received via the I/O path 508.

The control circuitry 502 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays, application-specific integrated circuits, etc. In some embodiments of the present disclosure, the control circuitry 502 executes instructions stored in memory (i.e., the storage 504) for controlling various portions of the apparatus 500 to perform the functions discussed above and below. For example, the control circuitry 502 executes instructions to control the adhesive dispersal module 503.

The adhesive dispersal module 503 applies the adhesive 108 on the first cooling surface 112 of the cooling plate 110. As shown, the adhesive dispersal module 503 may include a first resin 510, a second resin 512, and a hardener 514. Based on the cooling profile of the first cooling surface 112, the control circuitry 502 may control the mixing module 516 to mix varying ratios of the first resin 510 and the second resin 512 with the hardener 514 to compensate for the variable cooling capacity of the cooling surface. The control circuitry 502 may control the positioning motor 522 to change the location of the nozzle 518 for applying the mixed adhesive 108 to the first cooling surface 112. Although only a single nozzle 518 is shown, this is only an example and the nozzle 518 may contain multiple nozzles. For example, the mixing module 516 may contain multiple mixing modules for separately mixing the first resin 510 with the hardener 514 and the second resin 512 with the hardener 514. The separately mixed resins 510 and 512 may then be applied to the first cooling surface 112 through separate nozzles. In some embodiments of the present disclosure, the first resin 510, the second resin 512, and the hardener 514 may be mixed in the nozzle 518. In some embodiments of the present disclosure, the nozzle 518 may include a three-way mixing head, three separate mix heads, or two mix heads for disposing the first resin 510, the second resin 512, and the hardener 514 on the first cooling surface 112.

The positioning motor 522 may contain any number of motors (e.g., servos, stepper motors, etc.) for adjusting the position of the nozzle 518 with respect to the first cooling surface 112. The positioning motor 522 may be controlled by control circuitry 502.

The adhesive dispersal module 503 may additionally include sensors 520 (e.g., a camera or any other suitable sensor) to track the dispersal of the adhesive 108 on the first cooling surface 112, or to meter the amounts of the first resin 510, the second resin 512, and hardener 514 provided to the mixing module 516. The output of sensors 520 may be provided to controller 501, which may use the output to control the operation of the adhesive dispersal module 503.

Figure 6:
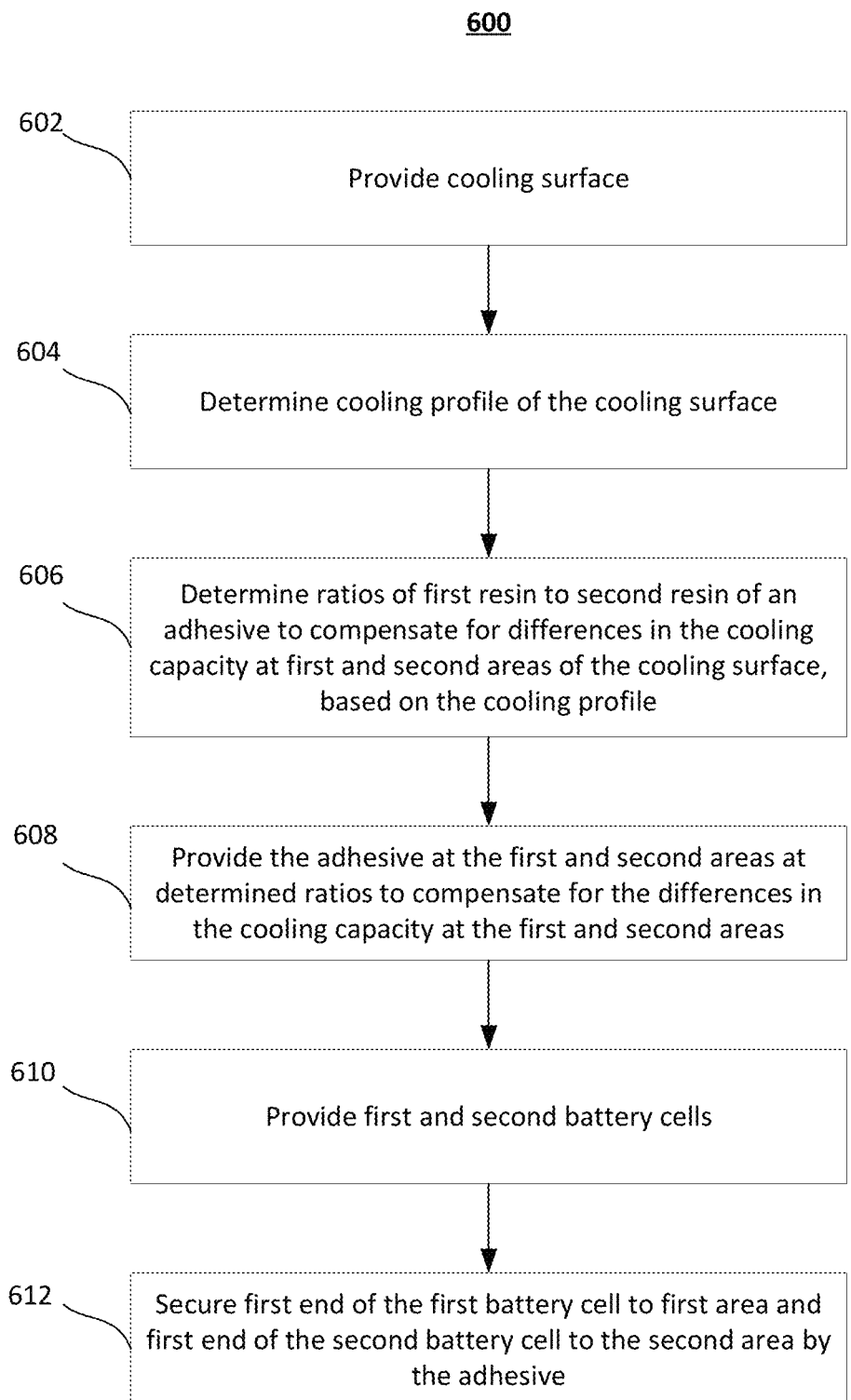
FIG. 6 shows a flowchart of a process for manufacturing a battery module, in accordance with some embodiments of the present disclosure.

FIG. 6 shows a flowchart of an illustrative process 600 for manufacturing a battery module 100, in accordance with some embodiments of the present disclosure. To avoid overcomplicating the description, process 600 is described with respect to only two battery cells 102 in the battery module 100. However, it should be understood that the process 600 may be used for manufacturing the battery module 100 (or the battery module 400) with any suitable number of the battery cells 102.

At step 602, a cooling surface is provided. The cooling surface may be the first cooling surface 112 of the cooling plate 110, as described above.

At step 604, a cooling profile of the cooling surface may be determined. As detailed above, the cooling profile may be determined by experimentation (e.g., by measuring the cooling capacity across the cooling surface) or by modeling the cooling profile of the cooling surface. In some embodiments of the present disclosure, the cooling profile may be retrieved from a database (e.g., by the controller 501 through the I/O path 508).

At step 606, ratios of a first resin having a first thermal coefficient to a second resin having a second thermal coefficient of an adhesive (e.g., the adhesive 108) to compensate for the differences in the cooling capacity at first and second areas of the cooling surface may be determined based on the cooling profile. (e.g., where the plurality of battery cells will be disposed) is determined. For example, the control circuitry 502 may determine the ratios based on the cooling profile of the cooling surface.

At step 608, the adhesive may be provided at the first and second areas of the cooling surface at the determined ratios to compensate for the differences in cooling capacity between the first and second areas. For example, the controller 501 may control the adhesive dispersal module 503 to provide the adhesive at the first and second areas at the determined ratios. As described above, the ratio (of the first resin to the second resin) of the adhesive provided at an area (e.g., the first or the second area) may have a same ratio for the entire area or a ratio that varies across the area.

At step 610, a first battery cell and a second battery cell may be provided.

At step 612, first ends of the first and second battery cells may be secured to the cooling surface by the adhesive. For example, the first end of the first battery cell may be secured to the first area by the adhesive having a first ratio of the first resin to the second resin, and the first end of the second battery cell may be secured to the second area by the adhesive having a second ratio of the first resin to the second resin, that is different from the first ratio. To secure the first and the second battery cells to the cooling surface, the first ends of the first and the second battery cells may be pressed into the adhesive before the adhesive cures.

It will be understood that while process 600 was described in the context of manufacturing a battery module and securing battery cells to a cooling surface, process 600 may be used for securing any two components to a surfaces using an adhesive, where different thermal conductivity of the adhesive is desired.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery module comprising:
    a cooling surface comprising a first area and a second area, wherein the first area and the second area have different cooling capacities;
    an adhesive comprising a first component having a first thermal conductivity and a second component having a second thermal conductivity; and
    a first battery and a second battery,
    wherein:
        a first end of the first battery is secured to the first area by a first portion of the adhesive and a first end of the second battery is secured to the second area by a second portion of the adhesive,
        the first portion of the adhesive has a first ratio of the first component to the second component and the second portion of the adhesive has a second ratio of the first component to the second component, and
        the first ratio and the second ratio are different and compensate for the different cooling capacities of the first area and the second area.

2. The battery module of claim 1, wherein:
    each of the first component and the second component is a resin, and
    the adhesive further comprises a hardener.

3. The battery module of claim 1, further comprising a cooling plate, wherein the cooling surface forms a first side of the cooling plate.

4. The battery module of claim 3, wherein the cooling plate further comprises an input port, an output port, and a cooling channel, wherein a cooling fluid can pass from the input port to the output port through the cooling channel.

5. The battery module of claim 1, wherein:
    the first area has a first cooling capacity and the second area has a second cooling capacity, the first cooling capacity being greater than the second cooling capacity,
    the first thermal conductivity is greater than the second thermal conductivity,
    the first ratio of the first component to the second component is greater than the second ratio of the first component to the second component, and
    the first ratio and the second ratio compensate for the difference between the first cooling capacity and the second cooling capacity such that the first battery and the second battery are provided with the same cooling capacity.

6. The battery module of claim 1, wherein:
the first thermal conductivity is greater than or equal to 1.0 Watts/meter*Kelvin (W/m*K), and
the second thermal conductivity is less than or equal to 0.3 W/m*K.

7. The battery module of claim 1, wherein the adhesive further comprises a plurality of beads for spacing the first end of each of the first battery and the second battery a predetermined distance from the cooling surface.

8. The battery module of claim 1, wherein the cooling surface is a first cooling surface, and
wherein the battery module further comprises:
a second cooling surface, opposite to the first cooling surface, wherein the second cooling surface comprises a third area and a fourth area, the third area and the fourth area having different cooling capacities; and
a third battery and a fourth battery,
wherein:
a first end of the third battery is secured to the third area by a third portion of the adhesive, and a first end of the fourth battery is secured to the fourth area by a fourth portion of the adhesive,
the third portion has a third ratio of the first component to the second component and the second portion has a fourth ratio of the first component to the second component, and
the third ratio and the fourth ratio are different and compensate for the different cooling capacities of the third area and the fourth area such that the third battery and the fourth battery are provided with similar cooling capacity.

9. The battery module of claim 1, wherein:
the first ratio is an average ratio of the first component to the second component of the first portion, and
a ratio of the first component to the second component of the first portion varies within the first area.

10. The battery module of claim 1, wherein the first ratio is consistent within the first portion.

11. A method of assembling a battery module, comprising:
providing a cooling surface, wherein a cooling capacity of the cooling surface varies across the cooling surface;
providing an adhesive comprising a first component having a first thermal conductivity to a second component having a second thermal conductivity;
providing a first battery and a second battery;
applying the adhesive with a first ratio of the first component to the second component to a first area of the cooling surface;
applying the adhesive with a second ratio of the first component to the second component to a second area of the cooling surface;
securing a first end of the first battery to the first area using the adhesive applied to the first area; and
securing a first end of the second battery to the second area using the adhesive applied to the second area,
wherein the first ratio and the second ratio are different and compensate for the different cooling capacities of the first area and the second area.

12. The method of claim 11, wherein:
each of the first component and the second component is a resin, and
the adhesive further comprises a hardener.

13. The method of claim 11, further comprising providing a cooling plate comprising an input port, an output port, and a cooling channel, wherein the cooling surface forms a first side of the cooling plate.

14. The method of claim 11, further comprising determining a cooling profile of the cooling surface, wherein the cooling profile comprises the cooling capacity provided at each point across the cooling surface.

15. The method of claim 14, further comprising:
determining a first cooling capacity provided at the first area on the cooling surface, based on the cooling profile; and
determining a second cooling capacity provided at the second area on the cooling surface, based on the cooling profile,
wherein the first ratio and the second ratio compensate for the difference between the first cooling capacity and the second cooling capacity such that the first battery and the second battery are provided with the same cooling capacity.

16. The method of claim 11, wherein:
the first thermal conductivity is greater than or equal to 1.0 Watts/meter*Kelvin (W/m*K), and
the second thermal conductivity is less than or equal to 0.3 W/m*K.

17. The method of claim 11, further comprising providing a plurality of beads in the adhesive for spacing the first end of each of the first battery and the second battery a predetermined distance from the cooling surface.

18. The method of claim 11, wherein the cooling surface is a first cooling surface, and
wherein the method further comprises:
providing a second cooling surface, opposite to the first cooling surface, wherein a cooling capacity of the second cooling surface varies across the second cooling surface;
providing a third battery and a fourth battery;
applying the adhesive with a third ratio of the first component to the second component to a third area of the second cooling surface;
applying the adhesive with a fourth ratio of the first component to the second component to a fourth area of the second cooling surface;
securing a first end of the third battery to the third area using the adhesive applied to the third area; and
securing a first end of the fourth battery to the fourth area using the adhesive applied to the fourth area,
wherein the third ratio and the fourth ratio are different and compensate for the different cooling capacities of the third area and the fourth area.

19. The method of claim 11, wherein:
the first ratio is an average ratio of the first component to the second component of the adhesive applied to the first area, and
a ratio of the first component to the second component of the adhesive applied to the first area varies within the first area.

20. The method of claim 11, wherein the first ratio is consistent within the first area.

* * * * *